J. W. FROST.
AUTOMATIC THERMOSTAT ADJUSTER.
APPLICATION FILED DEC. 4, 1908.

950,548.

Patented Mar. 1, 1910.
2 SHEETS—SHEET 1.

Witnesses
Inventor

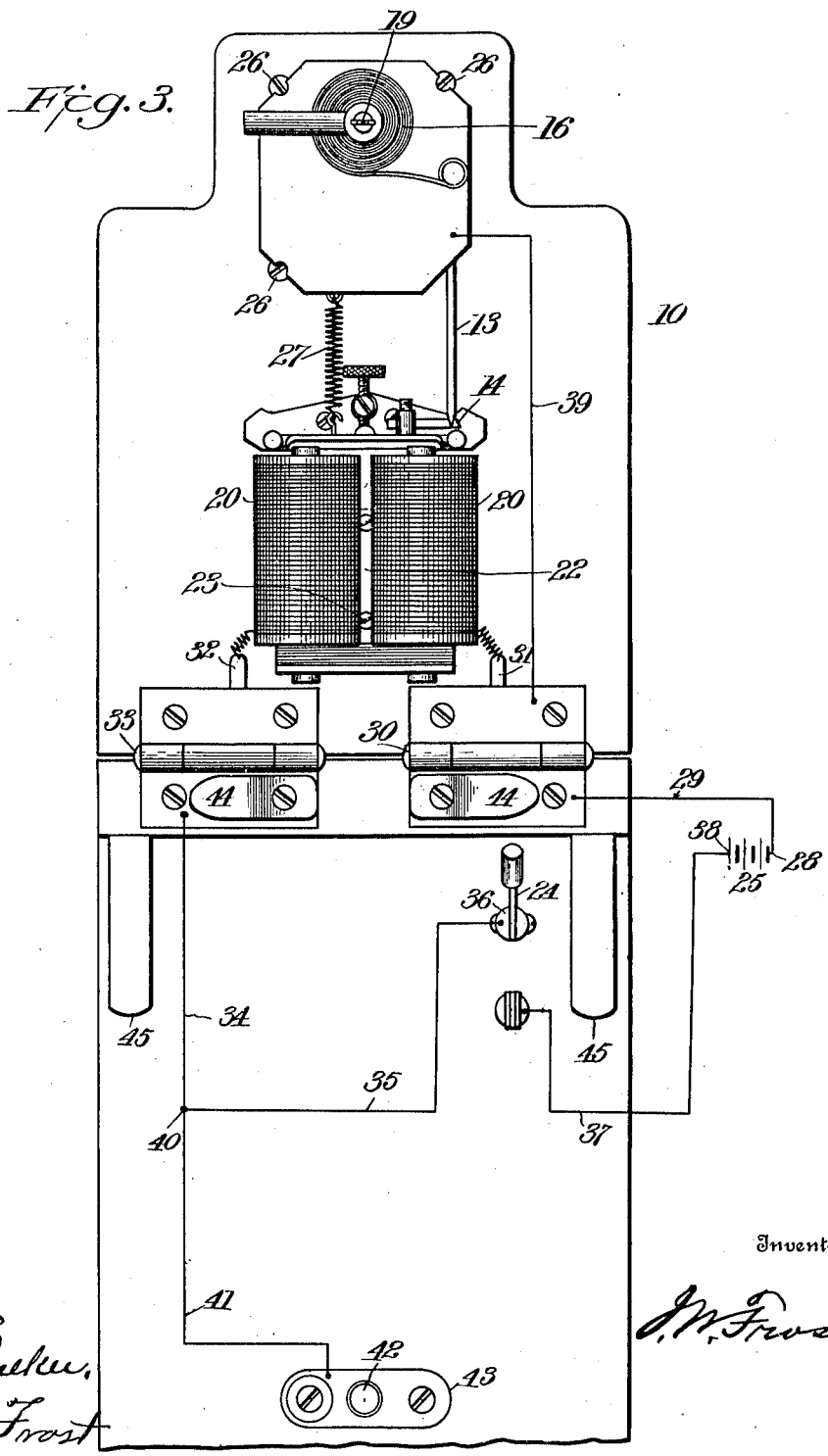

UNITED STATES PATENT OFFICE.

JOSEPH W. FROST, OF WASHINGTON, DISTRICT OF COLUMBIA.

AUTOMATIC THERMOSTAT-ADJUSTER.

950,548. Specification of Letters Patent. Patented Mar. 1, 1910.

Application filed December 4, 1908. Serial No. 466,000.

*To all whom it may concern:*

Be it known that I, JOSEPH W. FROST, a citizen of the United States, residing at Washington, in the District of Columbia, have invented certain new and useful Improvements in Automatic Thermostat-Adjusters, of which the following is a specification.

It is well understood by those versed in the art that correct manual adjustment (or adjustment by hand), of certain well known forms of electric thermostats, namely, those depending for their operation upon the expansion of metal under abnormal temperatures to complete or change an electric circuit, is extremely difficult because of the very small movement of the thermal element under the influence of the temperature usually sought to be guarded against. Thermostats of a certain kind, like that shown in Figure 2 (to be hereinafter fully described), are usually adjusted to the predetermined degree, by being first placed in a hot box, the temperature of which is slowly increased up to the desired point, and, while under the influence of such degree of temperature, having the electrodes slowly turned to contact by means of an adjustable set screw which usually forms one of the said electrodes. This fact, the small movement of the thermal element, together with other adverse conditions such as at times the over-tightness of the set screw in its bearing, renders it very difficult to adjust them accurately and precisely by hand; which however steady, is powerless to cope successfully with such delicate conditions.

The object of this device or invention is to provide means whereby the screw driver, instead of being operated by hand to turn the set screw to contact and no more, is operated by the shaft of a clock movement which is stopped electrically and instantly when the contacts are made.

Figure 1:
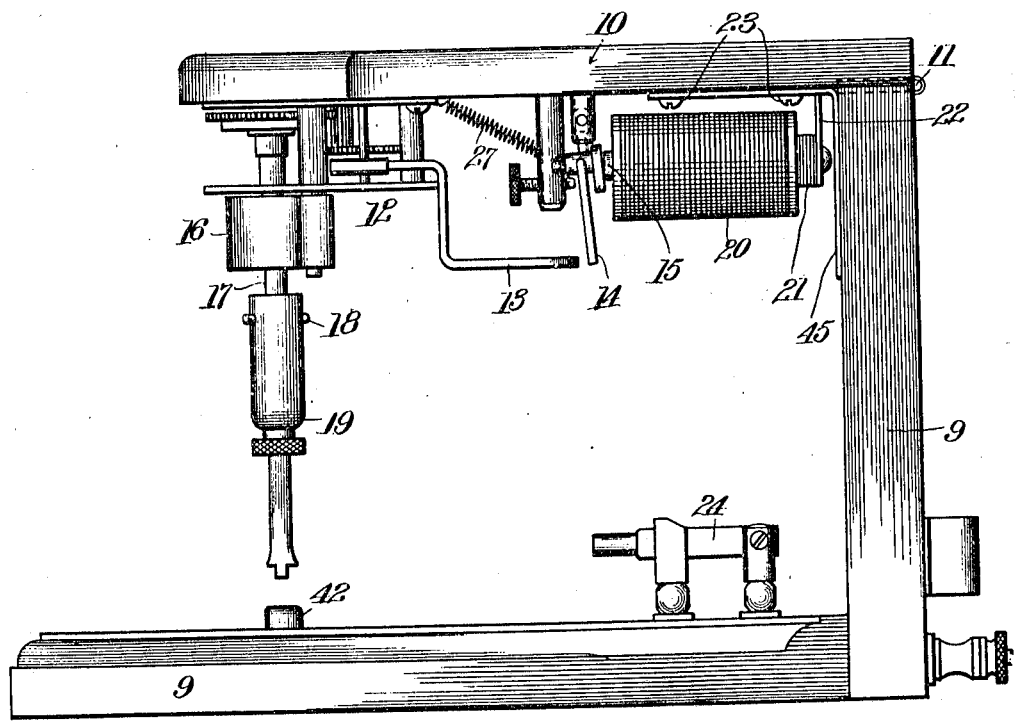
Figure 2:
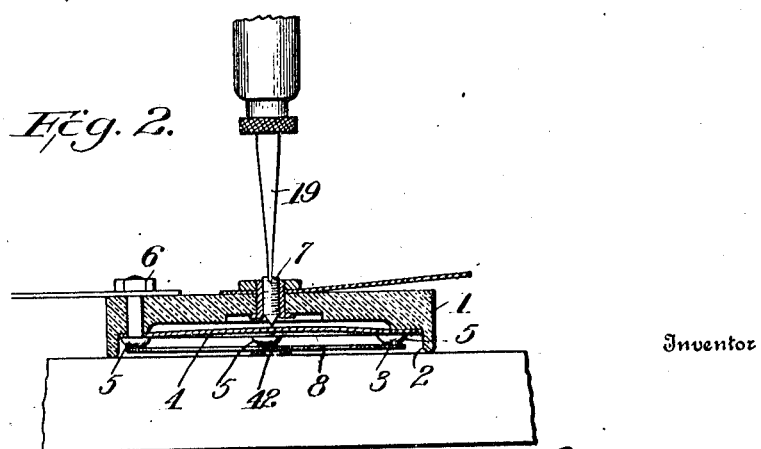

Fig. 1 is a side view of the automatic adjuster showing the operating position of same. Fig. 2 is a sectional view of a well known form of thermostat showing the operating connection between the same and the adjuster, and Fig. 3 is a face view of the automatic adjuster, showing the electrical connections.

In further explanation of the preliminary statement, I will first briefly describe the thermostat shown in Fig. 2 which this device is particularly adapted to operate in connection with.

The sectional view shown includes a circular porcelain base 1, molded in such a manner as to contain an annular recess 2 and a flat annular shoulder 3, together with the necessary holes for fastening the other parts to the base. In the circular recess and against the shoulder is loosely inserted a concave-convex metallic diaphragm 4, which by means of screws 5, 5, 5, and nuts 6 (only one shown) is bolted firmly to the base so that in expanding it warps or buckles in the direction of its convex side to contact with the point of set screw 7, which completes the circuit; the disk 4 being one electrode and the set screw 7, the other. A sectional view of a shield 8 is shown, the same being usually employed to protect the thermostatic disk with which it is electrically connected, from mechanical injury.

It is the extremely small movement or warping of the disk 4 under the influence of temperatures usually guarded against thermostatically, that makes a precise adjustment, as heretofore explained, very difficult.

Referring to Fig. 1, 9 is a wooden base upon which the parts of the device are mounted, 10 representing a part of same which is hinged at 11, so as to permit it to be raised and lowered for the purpose to be referred to later in these specifications. Upon this hinged portion 10, is suitably mounted a clock movement 12, the escapement or pendulum of which 13, is controlled by the armature lever 14, which armature lever 14, is in turn controlled, as shown, by the electromagnet 15; the coils of which 20, 20 (see Fig. 3) are secured to each other and to the base 10 (Fig. 1) by the yoke 21, the bracket 22 and the screws 23, 23. The device shown is a well known form of electromagnetic clockwork tripping device, used in connection with burglar, fire and other alarm signals. The train of wheels of the clock-work and the pendulum of the escapement, are driven or actuated by the coiled spring 16, connected to the main shaft 17. To this main shaft is fastened by means of the pin 18, a screw driver 19, for turning the set screw 7 (Fig. 2) down to contact with the disk of the thermostat. The screw driver shown is the well known form of ratchet screw driver which it is preferred to use. An ordinary form of two-point switch is shown by 24. This is included in the circuit of the coils 20, 20, (Fig. 3) and the battery 25, and is used to control the circuit of same.

In Fig. 1 the device is shown as being in operation; that is, the parts are shown in the position they are in when the clock-work train is running and the main shaft of same and the screw driver are turning, while in Fig. 3, the device or parts of same are shown in its normal position and before the switch 24, is closed to actuate the clock-work in the manner to be shown.

At Fig. 3 is more clearly shown the clock-work frame which supports the gearing fastened to the wood base by means of the screws 26, 26, 26, and also the pendulum 13 held in check by the armature lever 14, with the armature retracted from the magnet by means of the spring 27. The circuit is described as follows in connection with Fig. 3: from one pole 28, of the battery 25, through wire 29 to the hinge 30, and from thence by connector 31, to and through the magnet coils 20, 20, to connector 32, to and through hinge 33 by wires 34 and 35 to the heel point 36 of the two-point switch 24. From thence, when said switch is closed the circuit runs by wire 37 back to the opposite pole 38, of the battery. This describes the principal circuit of the device. A shunt circuit, normally open as shown, runs as follows: from hinge 30, wire 39, to the metallic clock movement frame of which the screw driver 19 is a part; here the shunt circuit is open. Another branch of this shunt circuit runs from connection 40 by wire 41 to contact button 42. This contact button and the frame to which it is connected, constitute the well known open circuit burglar alarm spring. It is evident that when the screw driver 19 comes into contact with the button 42, a shunt or short circuit is completed cutting the current from battery 25, off from the magnet coils 20, 20.

The operation of the device is as follows: The face of the thermostat, as shown at Fig. 2, and which consists of the metallic shield 8, in electrical connection with the thermostatic disk 4, is pressed against the button 42, leaving the set screw 7 or its slot, exposed for connection with and operation by the screw driver 19, after the hinged base 10 is turned down, to the position clearly shown by Fig. 1. The screw driver is then connected to the set screw, (Fig. 2) and the switch 24 is closed as shown at Fig. 1. The set screw point at this time is separated from the thermostatic disk which is at the same time under the influence of the predetermined degree of adjustment. The switch 24 being closed as shown in Fig. 1, the armature of the magnet 15 and armature lever, are attracted toward the coils, releasing the pendulum 13, which allows the clock-work to run and the main (screw driver) shaft 19 to turn. The circuit which causes this operation has been already described. When the point of the set screw 7 comes into contact with the disk, the previously described shunt circuit around the magnet coils is completed, the current diverted from said coils, the armature retracted by the coiled spring 27, and the clock movement is suddenly stopped. The switch 24 is then opened and the thermostat removed from connection with the shaft. The spring contacts 44, 44, fastened to the hinges 30, 33 (Fig. 3), are for the purpose of making more reliable the electrical contact between the two parts of the hinges 30, 33, when the hinged base 10 is turned down as in Fig. 1, to operative position. Two brackets, 45, 45, are also shown in Fig. 3 for the purpose of furnishing a rest for same when the hinged base 10, is in the position shown in Fig. 1.

It is plain that this invention is not restricted to the use of the particular form of thermostat here shown, or in fact to a thermostat at all; but may, respectively, be used in connection with any form of thermostat where the adjustment is effected by means of a set screw or its equivalent, or in connection with any other electrical device of a similar character.

What is claimed is—

1. In an electric checking device, the combination of the motor 12, controlling a screw driver 19; an electromagnetic device in circuit with a generator, 25, which actuates the said motor; means for starting the motor; and circuits and connections, substantially as described, for checking the said motor at a predetermined point.

2. In an automatic electric adjusting device, the combination of the motor 12, controlling a screw driver 19, an electro-magnetic device which controls the operation of said motor, an electric generator, (25), in circuit with the electromagnets of said controlling device, a switch (24), normally open and also included in said circuit; a shunt around said magnet coils the terminals of which shunt are connected respectively with the screw driver and a contact button 42, whereby on the closing of the switch the mechanism including said screw driver will be actuated and whereby on contact between the same and said button said electro-magnets or its coils will be shunted and the said mechanism checked, substantially as described.

3. In an electric adjusting device, the combination of the motor 12, controlling a driver 19; an electromagnetic device in circuit with a generator 25 which controls the motor; means (switch 24) for starting the motor, and circuits and connections substantially as described, for checking same at a predetermined point; and means for raising and lowering the driver, as by hinges 30—33, substantially as described.

In testimony whereof I have affixed my signature in presence of two witnesses.

JOSEPH W. FROST.

Witnesses:
J. G. McMahon,
Eliza A. Frost.